United States Patent Office 2,806,040  
Patented Sept. 10, 1957

2,806,040

PRODUCTION OF ACRYLIC ACID OR ITS DERIVATIVES USING A NICKEL HALIDE CATALYST IN THE PRESENCE OF AN ACTIVATOR CONTAINING SULFUR OR SELENIUM

Walter Reppe, Ludwigshafen (Rhine), Herbert Friederich, Worms, and Erich Henkel and Hans Lautenschlager, Ludwigshafen (Rhine), Germany, assignors to Badische Anilin- & Soda-Fabrik Aktiengesellschaft, Ludwigshafen (Rhine), Germany No Drawing. Application October 25, 1955,  
Serial No. 542,774

Claims priority, application Germany October 26, 1954

7 Claims. (Cl. 260—347.4)

This invention relates to an improved method of manufacturing acrylic acid or its derivatives. More particularly this invention deals with the employment of activators for the synthesis of acrylic acid or its derivatives by the interaction of acetylene, carbon monoxide and a compound with a reactive hydrogen atom in the presence of a nickel halide. As a rule, from 1 to 10 moles of the activator are employed for 1 mole of the nickel halide.

It has already been proposed to prepare acrylic acid or its derivatives by reacting carbon monoxide with acetylene and water or compounds having reactive hydrogen atoms, as for example alcohols, in the presence of carbonyl-forming metals or their compounds, in particular nickel halides, at elevated temperatures and under pressure. Inert oxygen-containing organic solvents, as for example tetrahydrofurane and other ethers, esters or ketones, have already been used. The co-employment of such solvents is recommended especially because it renders possible an increase in the concentration of acetylene and carbon monoxide in the reaction liquid.

In carrying out the process industrially it has proved that only unsatisfactory throughputs are obtained in general by the use of nickel halides alone as catalysts. The use of larger amounts of nickel halides moreover readily leads to the separation of basic salts and thermal segregation of the reaction liquid.

It is an object of this invention, therefore, to increase the activity of the nickel halide catalysts used for producing acrylic acid or its derivatives.

Another object is the addition of particular activators containing carbon, nitrogen and sulfur or selene in their molecule to the reaction mixture.

These and other objects which will be apparent from the more detailed description of the invention are accomplished by carrying out the reaction of acetylene with carbon monoxide and a compound with a reactive hydrogen atom while using a nickel halide as a catalyst by adding as an activator an organic compound containing on the same carbon atom a nitrogen atom and an atom of an element of the 6th group of the periodic arrangement of the elements having an atomic number between 16 and 34 at least, said nitrogen atom or at least said atom of the 6th group of the periodic arrangement being linked to said carbon atom by a double bond. These compounds which contain sulfur or selene as an element of the 6th group of the perodic arrangement are called hereinafter activators. They contain preferably one of the groups

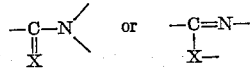

wherein X is sulfur or selene. The groups

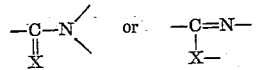

can be isomeric or mesomeric groups, and the activators according to this invention are therefore preferably thioamides or are derived from thioamides or from pseudo- or isothioamides. Suitable activators are for instance thiocarboxylic acid amides unsubstituted or substituted on the nitrogen, thioazole and the compounds derived therefrom by substitution in 2-, 4- and 5-position, as well as their partly hydrogenated derivatives, substituted thioureas and pseudothioureas, derivatives of mono- and dithiocarbamic acid, thiuram disulfides, isothiocyanic acid esters (mustard oils) and rhodamic acid. The activators should have preferably a good thermal stability and should not decompose when heated to a temperature of 150° C. or under the reaction conditions.

Some typical activators have the general formulas

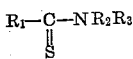

Thiocarboxylic acid amide

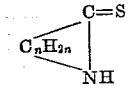

Thiolactams

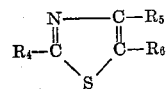

Thiazole

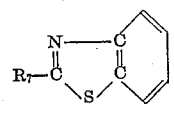

Benzothiazole

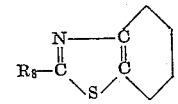

4.5.6.7-tetrahydrobenzthiazole

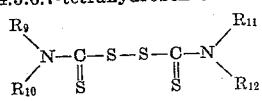

Thiuram disulfide wherein $R_1$, $R_2$ and $R_3$ are hydrogen or an alkyl radical having preferably from 1 to 10 carbon atoms or a cycloalkyl radical, such as cyclohexyl, or an aryl radical, such as phenyl, or an aralkyl radical such as benzyl, $n$ is an integer between 4 and 6, $R_4$, $R_5$, $R_6$, $R_7$ and $R_8$ are hydrogen or an amino or a mercapto radical or an alkyl radical containing preferably from 1 to 10 carbon atoms or a cycloalkyl radical, such as cyclohexyl, or an aryl radical, such as phenyl, or an aralkyl radical, such as benzyl, and wherein $R_9$, $R_{10}$, $R_{11}$ and $R_{12}$ are alkyl radicals containing preferably from 1 to 10 carbon atoms or $R_9$ and $R_{10}$ and/or $R_{11}$ and $R_{12}$ jointly constitute a bivalent polymethylene group containing from 4 to 6 methylene groups.

Other suitable activators are disclosed in the examples. As a rule, the mixture of the non-gaseous reactants should contain between 0.1 and 5.0 percent, preferably between 0.2 and 1.0 percent by weight of these activators referred to the total weight of the non-gaeous reaction mixture. It is also possible to use several activators.

Among the nickel halides, bromide and iodide are especially suitable for the process; metallic nickel or halogen-free nickel compounds can also be used in combination with free or combined halogen in the usual way. It is also possible, instead of using nickel halide and an activator, to employ complex compounds of the activator and a nickel halide or a nickel halide and a or several compounds which form under the reaction conditions an activator, such as secondary amines and carbon disulfide.

It is uncertain whether the action of the N—C—S- or N—C—Se-compounds rests on their capacity for reacting with the nickel halide with the formation of complex compounds. In any case it is without importance for the success of the process whether complex compounds which have already been prepared from a nickel halide and an activator are used for the synthesis or whether nickel halide and an activator are added to the initial mixture or to the residue containing catalyst remaining after working up the reaction mixture by distillation.

Compounds with reactive hydrogen atoms are water, alcohols, phenols, and carboxylic acids or amides. Alcohols suitable for this reaction are for instance methanol, ethanol, propanol, butanols, and higher saturated aliphatic alcohols having from 5 to 20 carbon atoms in their molecule. Cyclic alcohols, such as cyclohexanol, benzyl alcohol and furfuryl alcohol, may also be used.

The reaction conditions to be maintained during the reaction correspond, for the rest, to those usual in the acrylic synthesis according to W. Reppe as described in detail in Justus Liebig's "Annalen der Chemie," vol. 592 (1953), pp. 1–37. In general temperature of 100° to 250° C. and pressures of more than 5 atmospheres are used; the partial pressure of the acetylene preferably amounts to at least 3 atmospheres, or better 5 to 15 atmospheres. As solvents there may be mentioned in particular cyclic ethers, such as tetrahydrofurane and dioxane, and lower fatty ketones, such as acetone, which is preferably used in excess, and also in the case of the esters, also the corresponding alcohols. Other inert oxygen-containing acetylene-dissolving solvents which are preferably miscible with water, such as butyrolactone or N-methylpyrrolidone, are however also suitable in principle.

The following examples will further illustrate this invention but the invention is not restricted to these examples. The parts are parts by weight.

*Example 1*

A mixture of 80 parts of tetrahydrofurane, 10 parts of water, 0.3 part of nickel bromide and 1 part of thioacetamide are charged into a shaking bomb of stainless steel. After rinsing with nitrogen, 15 atmospheres of a gas mixture consisting of equal parts of acetylene and carbon monoxide are pressed in in the cold. The bomb is then heated to 180° C. whereby the pressure increases to about 35 atmospheres. Acetylene and carbon monoxide (1:1) are pressed in until the pressure is 45 atmospheres and such pressing in up to 45 atmospheres is repeated at half-hourly intervals for 12 hours. During this time, 168 atmospheres are absorbed by the reaction mixture. The product (115 parts) contains 26.4 parts of acrylic acid which can be recovered by distillation.

If 80 parts of tetrahydrofurane, 10 parts of water and 0.3 part of nickel bromide are reacted under the said conditions without any further addition, the average yield from a large number of reactions is only 12.1 parts of acrylic acid.

The following table shows the results obtained under otherwise identical conditions with a series of other activators:

| | Activator used | Amount in parts of— | | Gas absorption, atm. | Amount in parts of— | |
|---|---|---|---|---|---|---|
| | | activator | NiBr$_2$ | | reaction mixture | acrylic acid |
| 2 | N.N-dimethylthioacetamide | 1 | 0.3 | 159 | 116 | 26.8 |
| 3 | dimethylthioformamide | 1 | 0.3 | 138 | 113 | 24.9 |
| 4 | 2-amino-4.5.6.7-tetrahydrobenzthiazole hydrobromide | 1 | 0.3 | 196 | 118 | 31.8 |
| 5 | 2-amino-4-methylthiazole | 0.8 | 0.3 | 139 | 114 | 25.1 |
| 6 | 2-amino-4-propyl-5-ethylthiazole | 1.2 | 0.5 | 208 | 120 | 33.6 |
| 7 | 2.4-dimethylthiazole | 3 | 0.25 | 111 | 103 | 19.7 |
| 8 | 2-methyl-4.5.6.7-tetrahydrobenzthiazole | 1.5 | 0.25 | 152 | 112 | 25.1 |
| 9 | N.N'-diphenylthiourea | 1 | 0.3 | 142 | 115 | 26.3 |
| 10 | dipyrrolidyl thiuram disulfide | 1 | 0.3 | 139 | 117 | 27.8 |
| 11 | diethylamine hydrobromide and carbon disulfide | 1.1 / 0.8 | 0.25 | 185 | 118 | 29.3 |
| 12 | phenyl mustard oil | 1.5 | 0.3 | 150 | 113 | 25.8 |
| 13 | 2-mercaptothiazoline | 0.8 | 0.25 | 127 | 112 | 23.5 |
| 14 | rhodamic acid | 1 | 0.25 | 136 | 117 | 29.2 |
| 15 | 2-mercaptobenzothiazole | 1.5 | 0.25 | 171 | 110 | 22.9 |
| 16 | phenylselene-acetamide (C$_6$H$_5$CH$_2$CSeNH$_2$) | 1 | 0.25 | 127 | 112 | 24.7 |

*Example 17*

0.5 part of nickel bromide is dissolved in a melt of 1.5 parts of 2-amino-4.5.6.7-tetrahydrobenzthiazole. The yellow solution of the green melt in 80 parts of normal butanol is reacted in a shaking autoclave at 28 atmospheres and 185° C. with acetylene and carbon monoxide (1:1), subsequent pressing in being effected hourly. After 12 hours the increase in weight is 19 parts. The product contains 43.5 parts of acrylic acid butyl ester.

*Example 18*

0.5 part of nickel bromide is dissolved in 1.5 parts of 2-amino-4.5.6.7-tetrahydrobenzthiazole hydrobromide as in Example 17. The green solution of the solidified melt in 80 parts of 99% ethanol is reacted at 45 atmospheres and 185° C. with acetylene and carbon monoxide (1:1) with hourly subsequent pressing in. After 12 hours the increase in weight amounts to 13 parts. The product contains 30.4 parts of acrylic acid ethyl ester.

*Example 19*

2 parts of the complex (NiBr$_2$.2CS(NHC$_6$H$_5$)$_2$) prepared from nickel bromide and N.N'-diphenylthiourea are dissolved in a mixture of 80 parts of tetrahydrofurane and 10 parts of water. The reaction with acetylene and carbon monoxide (1:1) at 180° C. under the conditions of Example 1 yields 120 parts of product with 28.2 parts of acrylic acid.

*Example 20*

1.2 parts of nickel bromide are dissolved in a melt of 4 parts of N.N'-diphenylthiourea. The solution of the solidified green melt in 50 parts of tetrahydrofurane has 35 parts of 99% ethanol added thereto and is reacted with acetylene and carbon monoxide according to Example 1. After 12 hours the increase in weight is 19 parts. The product contains 27.2 parts of acrylic acid ethyl ester.

We claim:

1. In a method of manufacturing acrylic acid and its functional derivatives by the reaction of acetylene with carbon monoxide and a compound with a reactive hydrogen atom while using a nickel halide as a catalyst the improvement which comprises carrying out said reaction in the presence of a compound containing on the same carbon atom a nitrogen atom and an atom of an element of the 6th group of the periodic arrangement of the elements having an atomic number between 16 and 34, at least one of said nitrogen atom and said atom of the 6th group of the periodic arrangement being linked to said carbon atom by a double bond, said compound being selected from the class consisting of N,N'-diphenylthiourea, 2-mercaptothiazoline, rhodamic acid, a substituted acid amide of the general formula

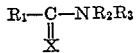

a thiolactam of the general formula

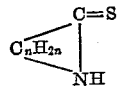

a thiazole of the general formula

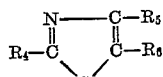

a benzothiazole of the general formula

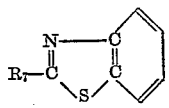

a 4.5.6.7-tetrahydrobenzthiazole of the general formula

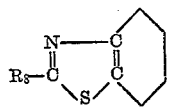

and a thiuram disulfide of the general formula

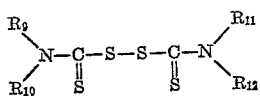

wherein X is a member selected from the class consisting of sulfur and selene, $R_1$, $R_2$ and $R_3$ are a member selected from the class consisting of hydrogen, an alkyl radical, a cycloalkyl radical, an aryl radical and an aralkyl radical, $n$ is an integer between 4 and 6, $R_4$, $R_5$, $R_6$, $R_7$ and $R_8$ are a member selected from the class consisting of hydrogen, an amino radical, a mercapto radical, an alkyl radical, a cycloalkyl radical, an aryl radical, and an aralkyl radical, $R_9$, $R_{10}$, $R_{11}$ and $R_{12}$ are a member selected from the class consisting of alkyl radicals, $R_9$ and $R_{10}$, and $R_{11}$ and $R_{12}$ jointly constitute a bivalent polymethylene group containing from 4 to 6 methylene groups.

2. A method as claimed in claim 1 wherein said reaction is carried out in the presence of thioacetamide.

3. A method as claimed in claim 1 wherein said reaction is carried out in the presence of 2-mercaptothiazole.

4. A method as claimed in claim 1 wherein said reaction is carried out in the presence of 2-aminothiazole.

5. A method as claimed in claim 1 wherein said reaction is carried out in the presence of 2-amino-4.5.6.7-tetrahydrobenzthiazole.

6. A method as claimed in claim 1 wherein said reaction is carried out in the presence of dipyrrolidyl thiuram disulfide.

7. In a method of manufacturing acrylic acid and its functional derivatives by the reaction of acetylene with carbon monoxide and a compound with a reactive hydrogen atom while using a nickel halide as a catalyst the improvement which comprises carrying out said reaction in the presence of N.N'-diphenylthiourea.

References Cited in the file of this patent
UNITED STATES PATENTS
2,738,364   Reppe et al. _____ Mar. 13, 1956
OTHER REFERENCES
Copenhaver et al.: "Acetylene and Carbon Monoxide Chemistry" (Reinhold Publishing Co., New York City, 1949), pp. 257–265, 296.